(12) United States Patent
Shintani et al.

(10) Patent No.: US 9,449,324 B2
(45) Date of Patent: Sep. 20, 2016

(54) REDUCING TV LICENSING COSTS

(75) Inventors: Peter Shintani, San Diego, CA (US);
Aran Sadja, San Diego, CA (US);
Theodore R. Booth, San Diego, CA (US); Ludovic Douillet, Escondido, CA (US)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 12/970,215

(22) Filed: Dec. 16, 2010

(65) Prior Publication Data
US 2012/0120250 A1    May 17, 2012

Related U.S. Application Data

(60) Provisional application No. 61/412,552, filed on Nov. 11, 2010.

(51) Int. Cl.
*H04N 5/44*    (2011.01)
*H04N 9/64*    (2006.01)
*H04N 21/434*    (2011.01)
(Continued)

(52) U.S. Cl.
CPC ............. *G06Q 30/018* (2013.01); *G06F 21/10* (2013.01); *G06F 21/125* (2013.01); *G06Q 20/20* (2013.01); *G06Q 30/0251* (2013.01); *G06Q 30/0283* (2013.01); *G06Q 40/10* (2013.01); *G06Q 40/12* (2013.12); *H04N 5/44* (2013.01); *H04N 5/4401* (2013.01); *H04N 9/641* (2013.01); *H04N 9/642* (2013.01); *H04N 21/2541* (2013.01); *H04N 21/2543* (2013.01); *H04N 21/25816* (2013.01); *H04N 21/4263* (2013.01); *H04N 21/4347* (2013.01); *H04N 21/4382* (2013.01);

(Continued)

(58) Field of Classification Search
CPC ............... H04N 5/4401; H04N 9/641; H04N 21/4263; H04N 9/642; H04N 21/4347; H04N 5/44
USPC ................ 725/131–133, 139–141, 151–153; 348/460, 552, 553, 844
See application file for complete search history.

(56) References Cited

U.S. PATENT DOCUMENTS 5,894,516 A    4/1999   Brandenburg
6,047,128 A    4/2000   Zander
(Continued)

FOREIGN PATENT DOCUMENTS

EP    0715243    6/1996
EP    0795809    9/1997
(Continued)

OTHER PUBLICATIONS

Peter Shintani, Aran London Sadja, Ludovic Douillet; "Activating Licensable Component of Consumer Electronics Device at Point of Sale", Non-final office action dated Apr. 25, 2012 in related U.S. Appl. No. 13/049,021.
(Continued)

*Primary Examiner* — Benjamin R Bruckart
*Assistant Examiner* — Jason Thomas
(74) *Attorney, Agent, or Firm* — John L. Rogitz

(57) ABSTRACT

A TV with various licensable components including, e.g., an ATSC demodulator requests a license for a component upon detection of a physical condition implicating use of the component, such as plugging a cable into a particular port, or upon receipt of a user-input command requiring use of the component, such as a request to autoscan channels.

4 Claims, 6 Drawing Sheets

(51) Int. Cl.
*H04N 21/426* (2011.01)
*H04N 21/254* (2011.01)
*G06Q 30/00* (2012.01)
*G06Q 30/02* (2012.01)
*H04N 21/258* (2011.01)
*H04N 21/438* (2011.01)
*H04N 21/658* (2011.01)
*G06F 21/10* (2013.01)
*G06Q 40/00* (2012.01)
*H04N 21/4627* (2011.01)
*G06Q 20/20* (2012.01)
*G06F 21/12* (2013.01)
*H04N 21/2543* (2011.01)
*H04N 21/6547* (2011.01)
*H04N 21/654* (2011.01)

(52) U.S. Cl.
CPC ...... *H04N21/4627* (2013.01); *H04N 21/6547* (2013.01); *H04N 21/6581* (2013.01)

(56) References Cited

U.S. PATENT DOCUMENTS

| | | | |
|---|---|---|---|
| 6,199,044 | B1 | 3/2001 | Ackley et al. |
| 6,658,663 | B1 | 12/2003 | Bruynsteen |
| 3,827,260 | A1 | 12/2004 | Stoutenburg et al. |
| 6,827,260 | B2 | 12/2004 | Stoutenburg et al. |
| 7,222,206 | B2 | 5/2007 | Kee et al. |
| 7,292,692 | B2 | 11/2007 | Bonan et al. |
| 7,350,707 | B2 | 4/2008 | Barkan et al. |
| 7,487,129 | B2 | 2/2009 | Doll-Steinberg |
| 7,508,459 | B2 | 3/2009 | Mayer et al. |
| 7,678,984 | B1 | 3/2010 | Lamere |
| 7,747,533 | B2 | 6/2010 | Zhang et al. |
| 7,890,430 | B2 | 2/2011 | Lopatic |
| 7,896,043 | B2 | 3/2011 | Kashiwai |
| 8,217,753 | B2 | 7/2012 | Harris |
| 8,266,710 | B2 | 9/2012 | Al-Azzawi |
| 2001/0034846 | A1 | 10/2001 | Beery |
| 2002/0002706 | A1 | 1/2002 | Sprunk |
| 2002/0049717 | A1 | 4/2002 | Routtenberg et al. |
| 2003/0066080 | A1 | 4/2003 | Kamienieki |
| 2003/0097571 | A1 | 5/2003 | Hamilton et al. |
| 2003/0158807 | A1 | 8/2003 | Takeshi |
| 2003/0191650 | A1 | 10/2003 | Turner et al. |
| 2004/0068740 | A1 | 4/2004 | Fukuda et al. |
| 2004/0098752 | A1 | 5/2004 | Bruynsteen |
| 2004/0249815 | A1 | 12/2004 | Lee |
| 2005/0039025 | A1 | 2/2005 | Main et al. |
| 2005/0138387 | A1 | 6/2005 | Lam et al. |
| 2005/0154795 | A1 | 7/2005 | Kuz et al. |
| 2006/0022034 | A1 | 2/2006 | Barkar et al. |
| 2006/0059571 | A1 | 3/2006 | Chen et al. |
| 2006/0088010 | A1 | 4/2006 | Buchwald et al. |
| 2006/0106726 | A1 | 5/2006 | Raley et al. |
| 2006/0111920 | A1 | 5/2006 | Jacobs et al. |
| 2006/0131397 | A1 | 6/2006 | Reddy et al. |
| 2006/0146200 | A1* | 7/2006 | Edde et al. .................. 348/725 |
| 2006/0179058 | A1 | 8/2006 | Bram et al. |
| 2006/0190052 | A1 | 8/2006 | Yun et al. |
| 2006/0200420 | A1 | 9/2006 | Osada |
| 2007/0027815 | A1 | 2/2007 | Sobel et al. |
| 2007/0174919 | A1 | 7/2007 | Raines et al. |
| 2008/0005608 | A1 | 1/2008 | Greenlee |
| 2008/0083040 | A1 | 4/2008 | Dani et al. |
| 2008/0134237 | A1 | 6/2008 | Tu et al. |
| 2008/0178298 | A1 | 7/2008 | Arai et al. |
| 2008/0216177 | A1 | 9/2008 | Yokosato et al. |
| 2008/0243683 | A1 | 10/2008 | Patel et al. |
| 2008/0250443 | A1* | 10/2008 | Fan et al. .................. 725/25 |
| 2008/0313086 | A1 | 12/2008 | Milgramm |
| 2009/0006225 | A1 | 1/2009 | Multerer et al. |
| 2009/0019501 | A1 | 1/2009 | Saxena et al. |
| 2009/0106038 | A1 | 4/2009 | Sawaki et al. |
| 2009/0183000 | A1 | 7/2009 | Krig |
| 2009/0187965 | A1 | 7/2009 | Nakamura et al. |
| 2009/0212909 | A1 | 8/2009 | Burger et al. |
| 2009/0264104 | A1 | 10/2009 | Lee et al. |
| 2009/0293560 | A1 | 12/2009 | Ikeguchi |
| 2009/0307757 | A1 | 12/2009 | Groten |
| 2009/0319410 | A1 | 12/2009 | Knight et al. |
| 2009/0320073 | A1 | 12/2009 | Reisman |
| 2010/0026912 | A1 | 2/2010 | Ho |
| 2010/0144336 | A1 | 6/2010 | Kuk et al. |
| 2010/0156592 | A1 | 6/2010 | Lewis |
| 2010/0164681 | A1 | 7/2010 | Harris |
| 2010/0192180 | A1 | 7/2010 | Olague et al. |
| 2010/0218181 | A1 | 8/2010 | Seiden |
| 2010/0250400 | A1 | 9/2010 | Fernandez Gutierrez |
| 2010/0302380 | A1 | 12/2010 | Law et al. |
| 2011/0047540 | A1 | 2/2011 | Williams et al. |
| 2011/0054923 | A1 | 3/2011 | Miloslavsky et al. |
| 2011/0166968 | A1* | 7/2011 | Houng et al. .................. 705/30 |
| 2011/0295843 | A1 | 12/2011 | Ingrassia, Jr. et al. |
| 2011/0302623 | A1 | 12/2011 | Ricci |
| 2012/0120250 | A1 | 5/2012 | Shintnai et al. |
| 2012/0263297 | A1 | 10/2012 | Bennett et al. |
| 2014/0229583 | A1 | 8/2014 | Engstrom et al. |

FOREIGN PATENT DOCUMENTS

| | | |
|---|---|---|
| JP | H09319571 | 12/1997 |
| JP | 2001331228 | 11/2001 |
| JP | 2003304458 | 10/2003 |
| JP | 2004062561 | 2/2004 |
| JP | 2004248052 | 9/2004 |
| JP | 2004252931 | 9/2004 |
| JP | 2006215890 | 8/2006 |
| JP | 2007516627 | 6/2007 |
| JP | 2007295255 | 11/2007 |
| JP | 2010200163 | 9/2010 |
| JP | 2010238248 | 10/2010 |
| KR | 1020050115299 | 7/2005 |
| WO | 2006092840 | 9/2006 |

OTHER PUBLICATIONS

Peter Shintani, Aran London Sadja, Ludovic Douillet; "Activating Licensable Component of Consumer Electronics Device at Point of Sale", Applicants response to Non-final office action dated Apr. 25, 2012 in related U.S. Appl. No. 13/049,021, filed May 14, 2012.

Peter Shintani, Ludovic Etienne Douillet, Aran London Sadja, "Coordinating License Activation of Licensable Audio Video (AV) Device Components Between Contract Manufacturer and Brand Manufacturer", Non-final office action dated Jun. 1, 2012 in related U.S. Appl. No. 13/073,047.

Peter Shintani, Ludovic Etienne Douillet, Aran London Sadja, "Coordinating License Activation of Licensable Audio Video (AV) Device Components Between Contract Manufacturer and Brand Manufacturer", Applicants response to Non-final office action dated Jun. 1, 2012 in related U.S. Appl. No. 13/073,047, filed Jun. 11, 2012.

Peter Shintani, Ludovic Douillet, "Activating Licensable Component Provided by Third Party to Audio Video Device", related pending U.S. Appl. No. 13/034,179, filed Feb. 24, 2011.

Peter Shintani, Ludovic Douillet, "Activating Licensable Component Using Aggregating Device in Home Network", related pending U.S. Appl. No. 13/034,093, filed Feb. 24, 2011.

Peter Shintani, Aran Sadja, Ludovic Douillet, "Activating Licensable Component of Consumer Electronic Device at Point of Sale", related pending U.S. Appl. No. 13/049,021, filed Mar. 16, 2011.

Peter Shintani, Aran Sadja, Ludovic Douillet, "Activating Licensable Component of Consumer Electronic Device Post-Sale Using Software Package", related pending U.S. Appl. No. 13/072,941, filed Mar. 28, 2011.

Peter Shintani, Aran Sadja, Ludovic Douillet, "Tracking Details of Activation of Licensable Component of Consumer Electronic Device", related pending U.S. Appl. No. 13/072,978, filed Mar. 28, 2011.

(56) References Cited

OTHER PUBLICATIONS

Peter Shintani, "Tracking Activation of Licensable Component in Audio Video Device by Unique Product Identification", related pending U.S. Appl. No. 13/048,981, filed Mar. 16, 2011.
Peter Shintani, Stephane Lejeune, Robert Blanchard, Graham Clift, "Audio Video Device with Externally Bundled TV Tuner", related pending U.S. Appl. No. 13/073,222, filed Mar. 28, 2011.
Peter Shintani, "Supplying Omitted Critical Code portion to Activate Licensable Component in Audio Video Device", related pending U.S. Appl. No. 13/045,835, filed Mar. 11, 2011.
Peter Shintani, Ludovic Douillet, Aran Sadja, "Coordinating License Activation of Licensable Audio Video (AV) Device Components Between Contract manufacturer and Brand Manufacturer", related pending U.S. Appl. No. 13/073,047, filed Mar. 28, 2011.
Peter Shintani, Aran Sadja, Ludovic Douillet, "Tracking Details of Activation of Licensable Component of Consumer Electronic Device", related U.S. Appl. No. 13/072,978, non-final office action dated Feb. 14, 2013.
Peter Shintani, Ludovic Douillet, Aran Sadja, "Activating Licensable Component of Consumer Electronics Device at Point of Sale", related U.S. Appl. No. 13/049,021, final office action dated Aug. 3, 2012.
Peter Shintani, Ludovic Douillet, Aran Sadja, "Activating Licensable Component of Consumer Electronics Device at Point of Sale", related U.S. Appl. No. 13/049,021 applicant response filed Sep. 18, 2012 to final office action.
Peter Shintani, Ludovic Douillet, Aran Sadja, "Coordinating License Activation of Licensable Audio Video (AV) Device Components between Contact Manufacturer and Brand Manufacturer", related U.S. Appl. No. 13/073,047 final office action dated Aug. 28, 2012.
Peter Shintani, Ludovic Douillet, Aran Sadja, "Coordinating License Activation of Licensable Audio Video (AV) Device Components between Contact Manufacturer and Brand Manufacturer", related U.S. Appl. No. 13/073,047 applicants response filed Sep. 18, 2012 to final office action.
Peter Shintani, "Supplying Omitted Critical Code Portion to Activate Licensable Component in Audio Video Device", related U.S. Appl. No. 13/045,835, non-final office action dated Sep. 20, 2012.
Peter Shintani, "Supplying Omitted Critical Code Portion to Activate Licensable Component in Audio Video Device", related U.S. Appl. No. 13/045,835 applicants response filed Sep. 27, 2012 to non-final office action.
Peter Shintani, Ludovic Etienne Douillet, "Activating Licensable Component Provided by Third Party To Audio Video Device", related U.S. Appl. No. 13/034,179 non-final office action dated Apr. 17, 2013.
Peter Shintani, Aran London Sadja, Ludovic Etinne Douillet, "Tracking Details of Activation of Licensable Component of Consumer Electronics Device", related U.S. Appl. No. 13/072,978 non-final office action dated Apr. 18, 2013.
Peter Shintani, Ludovic Etienne Doulliet, "Activating Licensable Component Provided by Third Party to Audio Video Device", related U.S. Appl. No. 13/034,179 final office action dated Jan. 14, 2013.
Peter Shintani, "Tracking Activation of Licensable Component in Audio Video Device by Unique Product Identification", related U.S. Appl. No. 13/048,981 Non-Final office action dated Jan. 4, 2013.
Peter Shintani, Stephane Lejeune, Robert Blanchard, Graham Clift, "Audio Video Device with Externally Bundled TV Tuner", related U.S. Appl. No. 13/073,222 Non-Final office action dated Dec. 21, 2012.
Peter Shintani, Ludovic Etienne Douillet, "Activating Licensable Component Using Aggregating Device in Home Network" related U.S. Appl. No. 13/034,093 Examiner's Answer dated Nov. 12, 2014.
Peter Shintani, Ludovic Etienne Douillet, "Activating Licensable Component Using Aggregating Device in Home Network" related U.S. Appl. No. 13/034,093 Applicant Reply Brief filed Nov. 13, 2014 in response to the Examiners Answer.
Peter Shintani, Aran London Sadja, Ludovic Etienne Douillet, "Tracking Details of Activation of Licensable Component of Consumer Electronic Device" related pending application non-final office action dated Sep. 17, 2014.
Peter Shintani, Aran London Sadja, Ludovic Etienne Douillet, "Tracking Details of Activation of Licensable Component of Consumer Electronic Device" applicants response to non-final office action in related pending application filed Oct. 31, 2014.

* cited by examiner

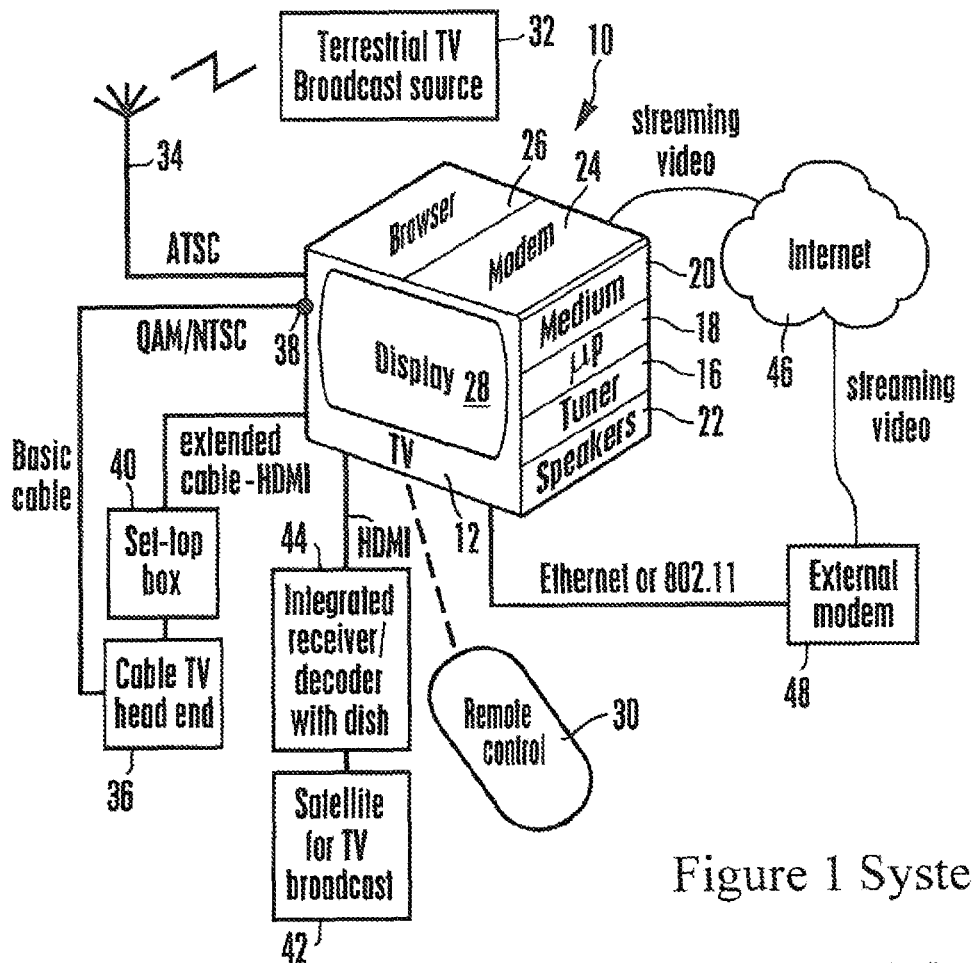
Figure 1 System
Figure 2 TV
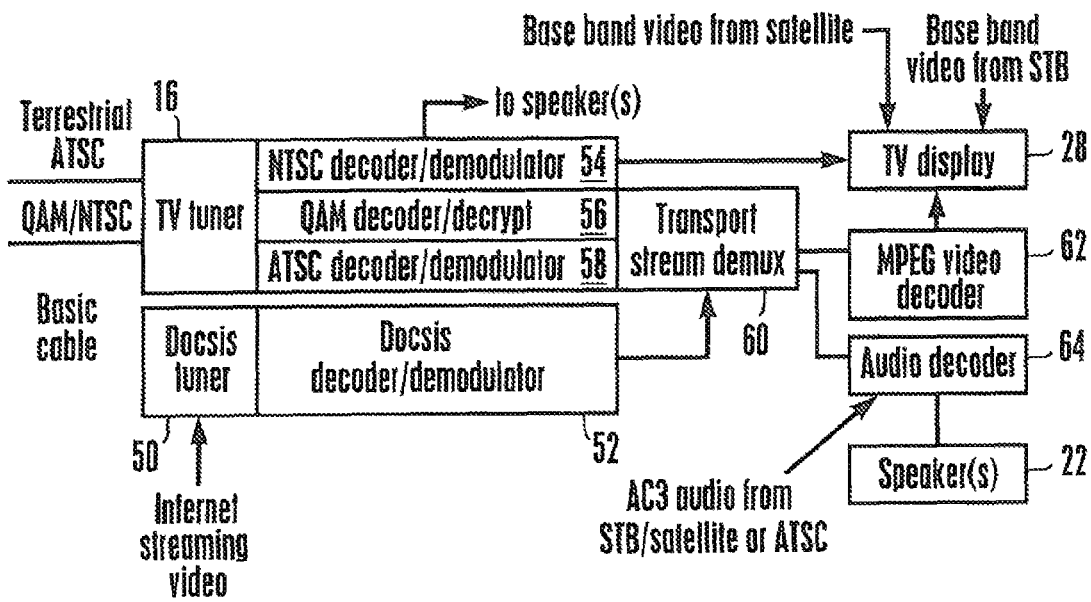

Setup logic auto license logic

Via Automated Phone Support

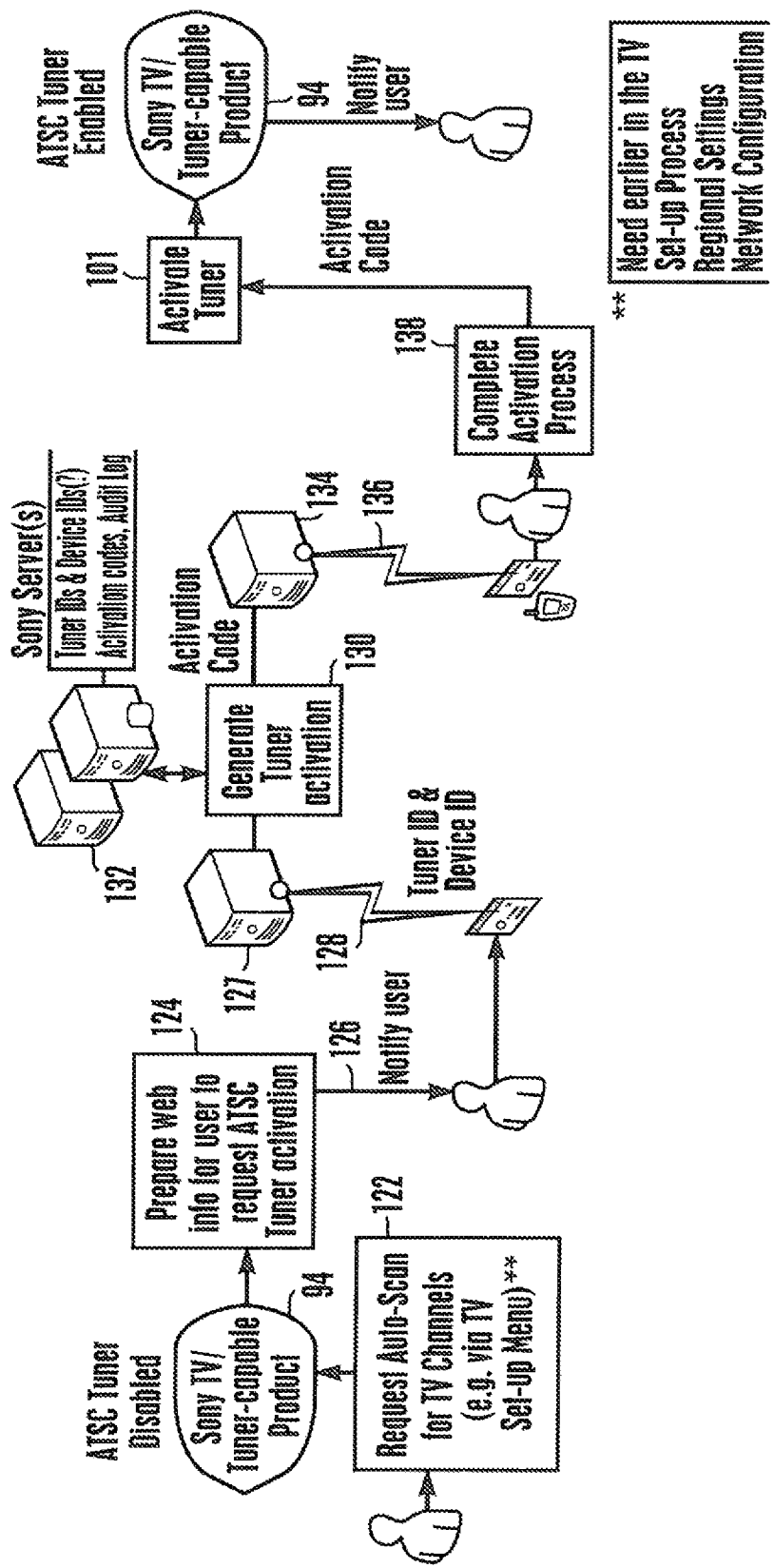
Figure 7 Via Web

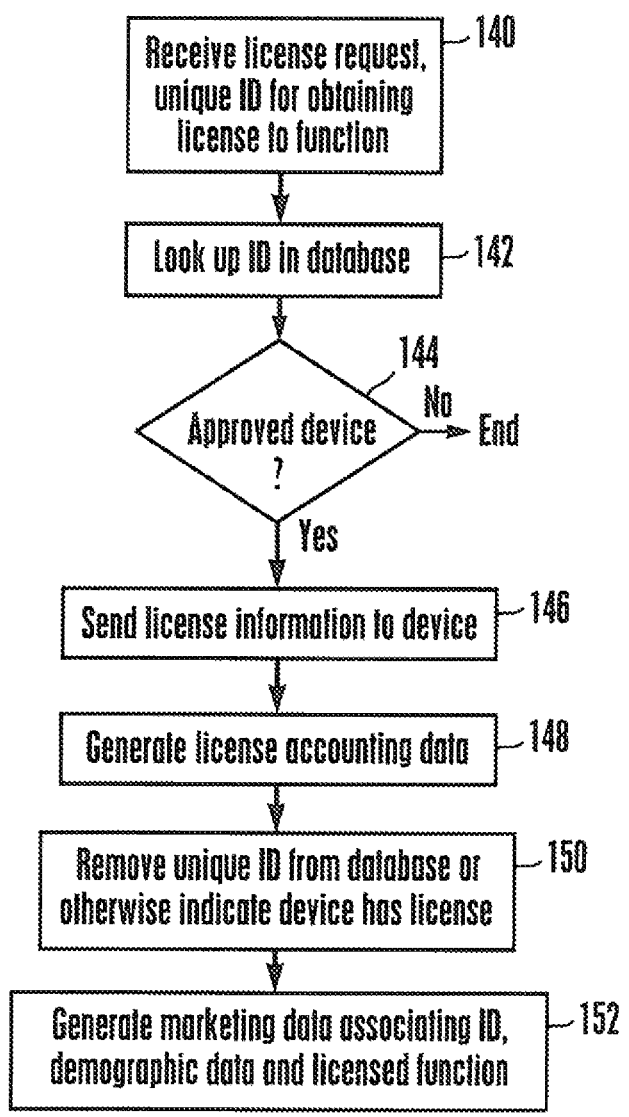
Figure 8  licensing logic

REDUCING TV LICENSING COSTS

This application claims priority to U.S. provisional patent application 61/412,552, filed Nov. 11, 2010.

FIELD OF THE INVENTION

The present application relates generally to reducing licensing costs of televisions and other audio-video display apparatus.

BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. As but one example, present principles understand that an ATSC demodulator and MPEG decoder are not used in a TV that receives only enhanced cable programming from a set-top box (STB) or satellite TV signals from a satellite TV integrated receiver/decoder (IRD), because baseband HDMI signals are received by the TV from the STB or IRD. Further, the present application understands that a terrestrially-broadcast EPG is not used under the conditions in the preceding sentence since the cable or satellite provider sends its own EPG for display, and the terrestrial broadcast EPG is of no use unless the user configures the TV connections to receive and display terrestrial TV signals. Nonetheless, license fees for the unused technologies are still paid, unnecessarily cascading cost.

Accordingly, a method includes, with a terrestrial broadcast quadrature amplitude modulation (QAM) demodulator assembly and/or an advanced television systems committee (ATSC) demodulator assembly of a TV deactivated and prior to purchasing a license for the ATSC demodulator assembly of the TV, determining whether a voltage exists in an automatic gain adjust (AGC) component of TV signal receiving assembly. Typically, AGC refers to an automatic gain adjusting signal that is generated by one component for use in another component and accordingly an AGC component is a component in which such a signal exists. Responsive to determining that a voltage exists in the AGC component of the TV signal receiving assembly, the method includes activating a national television systems committee (NTSC) demodulator assembly to process TV signals from the AGC component. It is determined whether energy in a non-NTSC portion of the spectrum exists in the TV signals and responsive to a determination that energy in a non-NTSC portion of the spectrum does not exist in the TV signals, the ATSC demodulator is maintained deactivated and a license for the ATSC demodulator assembly is not requested. The TV signals are processed using the NTSC demodulator for presentation of the TV signals on a TV display. On the other hand, responsive to a determination that energy in a non-NTSC portion of the spectrum exists in the TV signals, the ATSC demodulator assembly is activated to process the TV signals from the AGC component. Also, a license for the ATSC demodulator assembly of the TV is requested.

If desired, responsive to a determination that energy in a non-NTSC portion of the spectrum exists in the TV signals, the method may include sending a request to a licensing authority for a license for the ATSC demodulator. The request can include a unique identifier of the TV such as a combination of a serial number of the TV and a model number of the TV, or a high definition content protection (HDCP) key selection vector (KSV), or a digital transmission content protection (DTCP) certificate.

In example embodiments the method may include receiving license information responsive to the request. The ATSC demodulator cannot be activated without the license information, such that the act of activating the ATSC demodulator assembly to process the TV signals from the AGC component cannot occur prior to receiving the license information. In an alternative embodiment, however, the ATSC demodulator can be activated without the license information, such that the act of activating the ATSC demodulator assembly to process the TV signals from the AGC component can occur and the ATSC demodulator used to process the TV signals at least for a limited time period prior to receiving the license information.

In another aspect, an audio video (AV) assembly has a terrestrial broadcast advanced television systems committee (ATSC) demodulator assembly deactivated prior to purchasing a license for the ATSC demodulator assembly. A processor in the AV assembly determines whether a physical condition exists in the AV assembly and responsive to determining that the physical condition exists, automatically activates the ATSC demodulator assembly and otherwise does not activate the ATSC demodulator assembly. The activating includes communicating a request that results in a transaction related to the ATSC assembly to a licensing entity.

In another aspect, a TV includes at least one licensable component for which a license has not been obtained prior to vending the TV. A processor in the TV determines whether a condition exists in the TV and responsive to determining that the condition exists, activates the licensable component. Otherwise the processor does not activate the licensable component. The activating includes communicating information related to a license related to the licensable component to a licensing entity.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a block diagram of an example TV;

FIGS. 5-7 are schematic diagrams illustrating alternate methods for activating an ATSC demodulator; and FIG. 8 is a flow chart of non-limiting logic for licensing a component in a TV.

DETAILED DESCRIPTION OF THE PREFERRED EMBODIMENT

Figure 3:
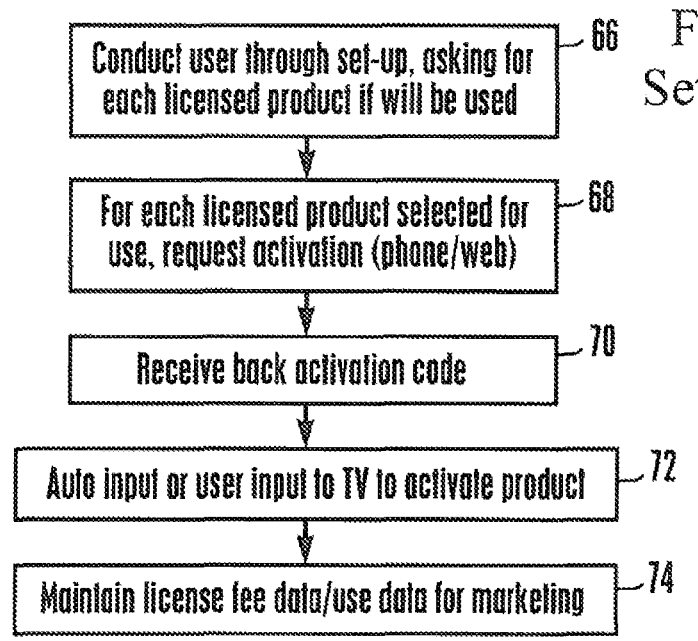
FIG. 3 is a flow chart of non-limiting TV set up logic in accordance with present principles.

Referring initially to the non-limiting example embodiment show in FIG. 1, a system 10 includes an audio video device such as a TV 12 including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be required based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user input at block 66 along with a unique identification of the TV, e.g. a hash of the TV model number and serial number, in some embodiments encrypted if desired. The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
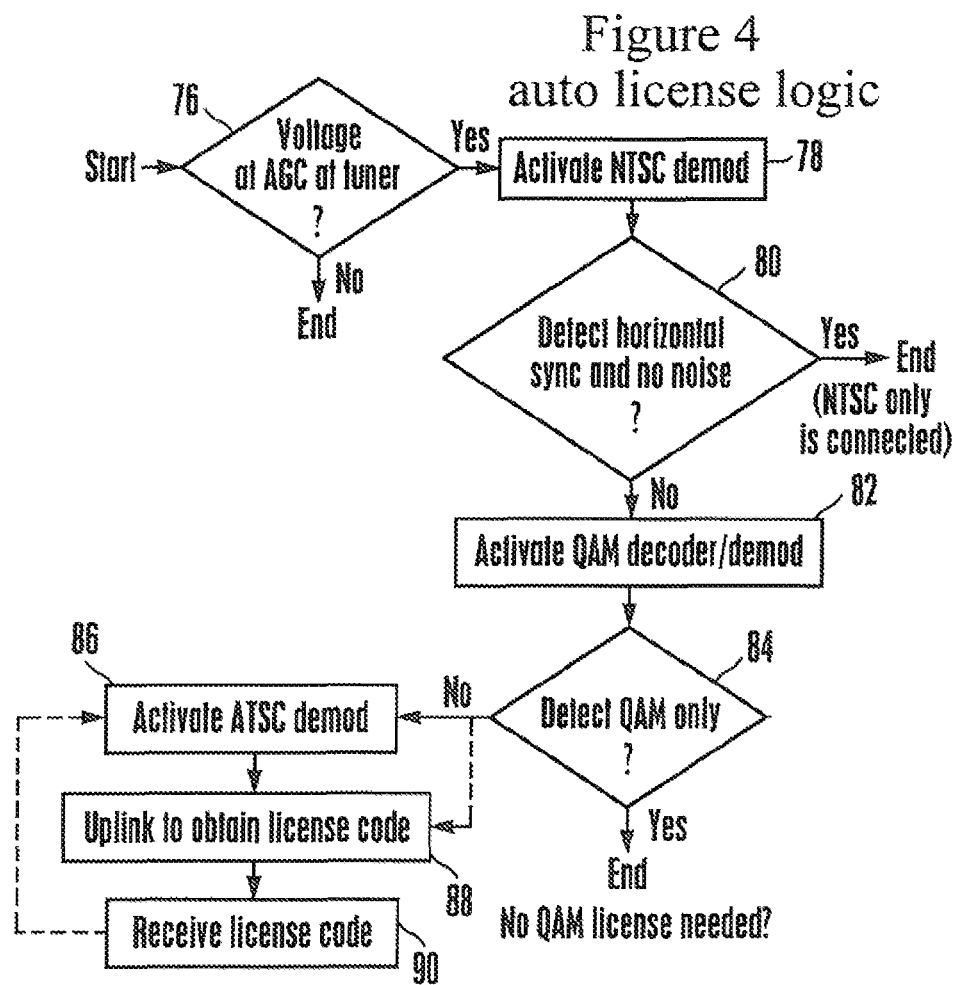
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18 to the above-described licensing entity/agent to obtain the license code discussed above using the unique ID of the TV, and at block 90 the code is received and used as necessary to permit use of the ATSC decoder/demodulator 58.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulator 58.

Yet again, as shown in dashed lines in FIG. 4 the logic may flow first from decision diamond 84 to blocks 88 and 90 to obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
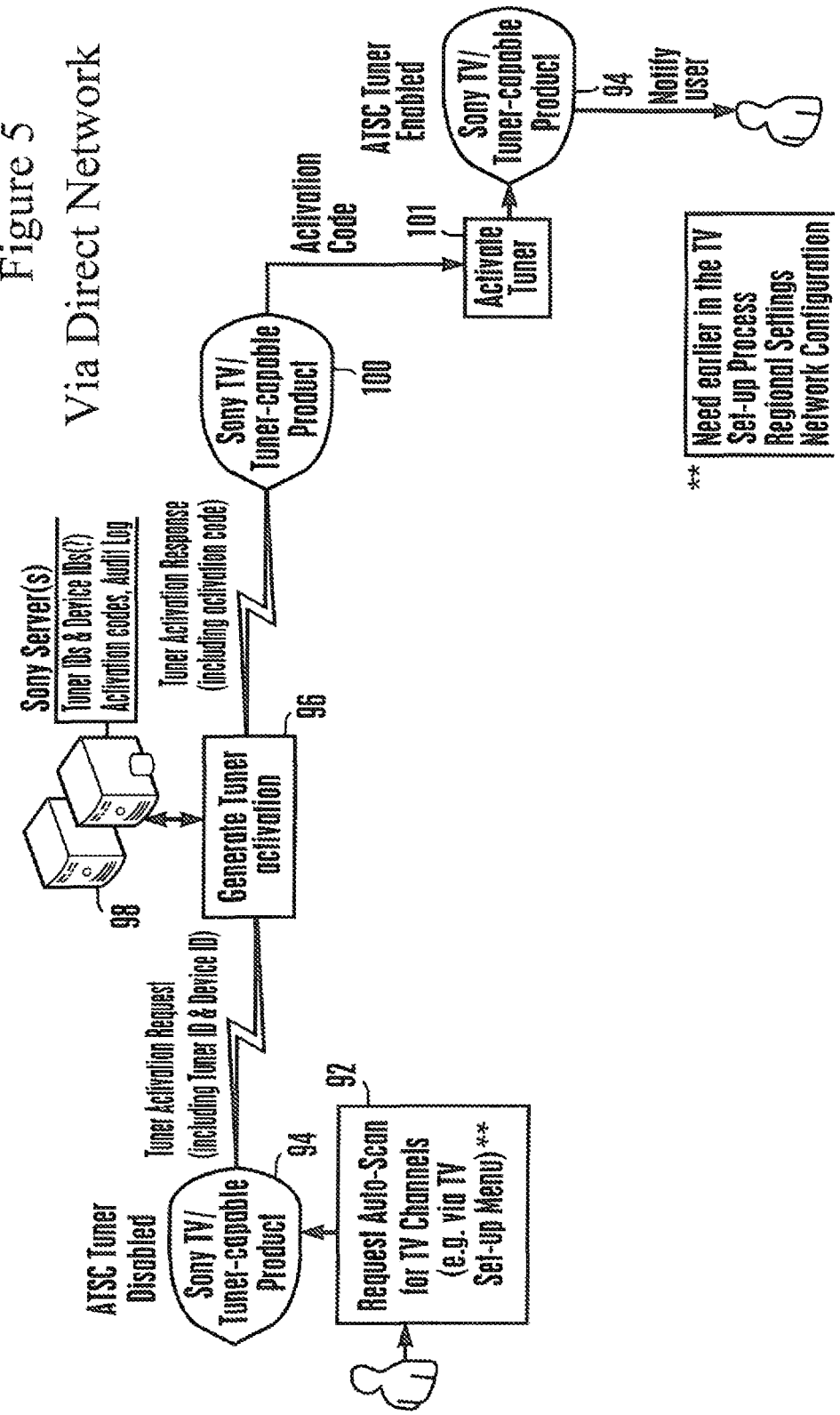
Figure 6:
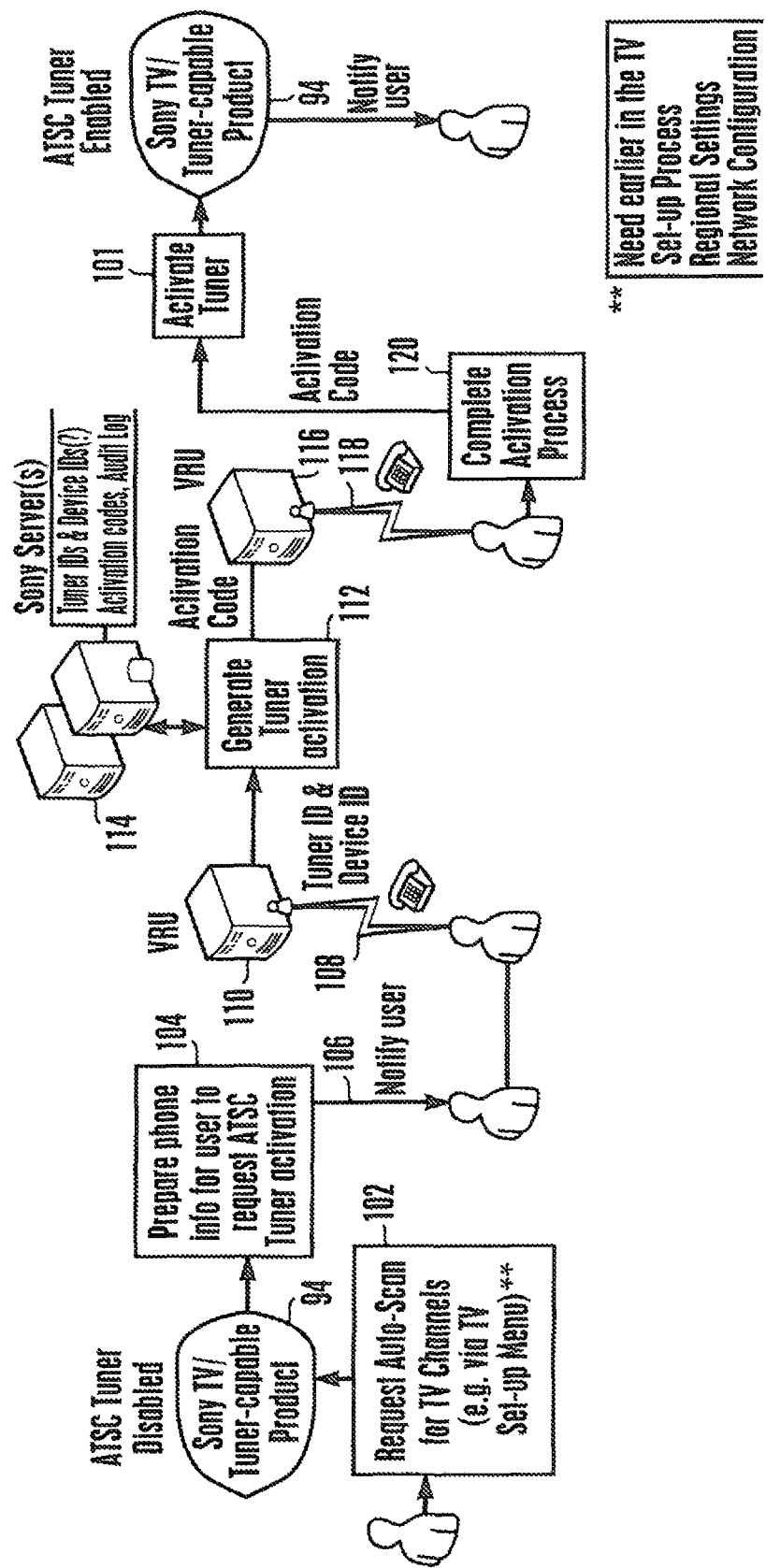

FIGS. 5-7 illustrate logic that may be used during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component. If desired, the TV may be vended with essential executable code missing from licensable components so that the components are not only non-enabled, they are non-functional. The activation codes sent to the TV pursuant to a license request in such embodiments may include the essential code that had been missing to render the components not only activated, but functional as well.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is prepared and the user notified 106 of the information by means of, e.g., a user interface or prompt presented on the product 94. The user enters 108 the information into a telephone, either by speaking the number or by holding the telephone adjacent a speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the manufacturer of the requesting device to the licensing authority for the component that is the subject of the request. At block 150 the authorized device database is modified to record the grant of the license.

Marketing data may be generated at block 152 based on the license grant. As an example, the total number of devices vended with the licensable component may be compared against the number of licenses granted to requesting devices to ascertain usage of the component compared to other components within the requesting device. For instance, it might be noted that 30% of vended devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Without limitation, the need for paying for licenses for the following technologies may be determined during TV set-up or subsequently by automatically detecting whether the technologies are being used:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital AC3 5.1ch, Dolby Digital Plus (DD+) 2ch, Pro-Logic2 (Surround Sound), MPEG audio 1&2 layer 1, 2, 3) MP3, DTS_Blueray disk (BD) (2CH/2CH+Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS), ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MHP/Ginga interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable component in production, pre-sale, without triggering the above-described license request mechanisms. A TV may be placed in a test activation mode used only in the manufacturing or test phase, and if desired the test mode may have a hardwired time out. A test key or keys can be used to activate licensable components and the license request algorithm recognizes a test key and responsive to the recognition does not request a license. The test activation mode may be hardwired to deactivate after a single power cycle and the TV processor may not permit reactivation of the test mode thereafter. Activation of a licensable component thereafter requires a production key which is associated with a license request.

While the particular REDUCING TV LICENSING COSTS is herein shown and described in detail, it is to be understood that the subject matter which is encompassed by the present invention is limited only by the claims.

What is claimed is:

1. TV comprising:
   at least one licensable component for which a license has not been obtained prior to vending the TV;
   a processor in the TV configured for determining whether a condition exists in the TV;
   the processor being configured for, responsive to determining that the condition exists, activating the licensable component and otherwise not activating the licensable component, the activating including communicating information related to a license related to the licensable component to a licensing entity, wherein the processor is further configured for:
   responsive to a determination that a physical condition exists, activating an NTSC demodulator;
   determining whether a signal at the NTSC tuner is an NTSC signal;
   responsive to a determination that NTSC signals only are present, not activating further licensable components, but responsive to a determination that signals other than NTSC signals are present, activating a QAM decoder/demodulator;
   responsive to a determination that QAM only is detected by the QAM decoder/demodulator, not activating further licensable components, but responsive to a determination that the QAM decoder/demodulator does not recognize a signal, activating an ATSC decoder/demodulator.

2. The TV of claim 1, wherein the licensable component is a terrestrial broadcast advanced television systems committee (ATSC) demodulator assembly.

3. The TV of claim 1, wherein the condition is a physical condition.

4. The TV of claim 1, wherein the condition is receipt of a user-generated command requiring use of the licensable component.

* * * * *